Figure 1:
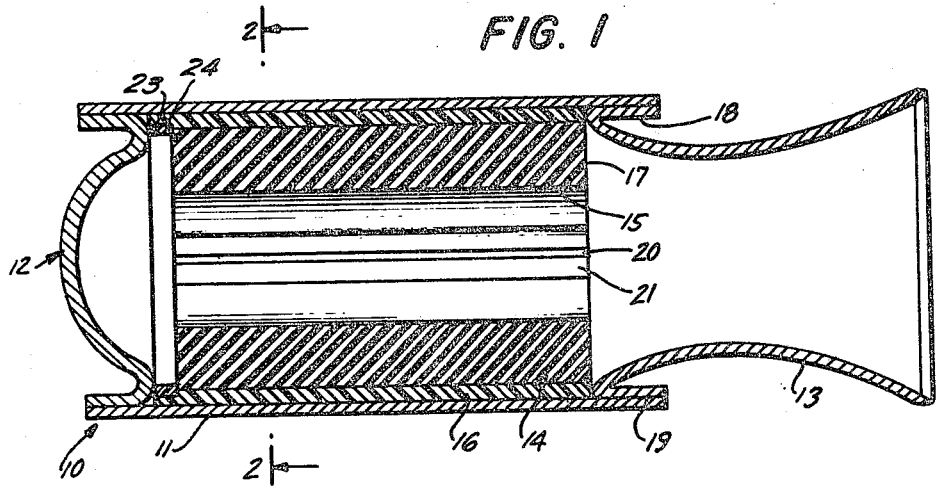

INVENTOR.
HAROLD DAVIES 3,188,802
SOLID PROPELLANT GRAIN
Harold Davies, Morris Plains, N.J., assignor to Thiokol Chemical Corporation, Bristol, Pa., a corporation of Delaware
Filed Nov. 29, 1961, Ser. No. 155,686
4 Claims. (Cl. 60—35.6)

The present invention relates to an improved construction in a solid propellant grain for rocket engines, and more particularly to a construction for relieving strain on the grain during thermal cycling which might adversely affect its firing characteristics.

Propellants are burned in a rocket engine to form gases which escape from a nozzle at one end and produce a resultant thrust. A very critical problem in the operation of solid propellant rocket engines is to control the rate of burning of the propellant to produce the desired thrust. Solid propellant charges are known in the art as "grains" and have designed shapes to provide a burning surface of the required area. However, if cracks develop in the grain, the burning surface is increased and, if the burning area exceeds a maximum limit, explosive destruction of the entire rocket engine may result.

Fissures and cracks are apt to occur in a grain during storage and may be caused by a strain on the grain, or between the grain and a surface to which it is bonded, as a result of expansion and contraction during the normal thermal cycling to which the grain is subjected. The formation of such cracks and fissures has been found to be particularly troublesome with double based propellants which tend to be brittle. For example, a grain may be subjected to a temperature range of −80° F. to 160° F. during storage. Thus, the material of the grain may be subjected to a temperature difference of as much as 240° F. Furthermore, the grain may be subjected to successive thermal cycles over a period of years, due to changes in the ambient temperature. Such normal thermal cycling during storage has been found to produce strains in the grain and produce cracks and fissures.

One of the objects of the present invention is to provide a grain construction in a rocket engine which relieves the grain of any strains which produce cracks during thermal cycling and affect its rate of burning.

Another object is to provide a grain which may be inserted into the casing of a rocket engine in the manner of a cartridge and is free to move relative to the casing to prevent strains due to expansion and contraction.

Another object is to provide a grain in a rocket engine which is bonded at its periphery to a shell that is free to expand and contract in the casing.

A still further object is to provide a grain for a rocket motor which achieves low strain without compromising its performance or its burning propellant flow rate.

Still another object is to provide a grain of the type indicated which is of a simple and compact construction, economical to manufacture and one which is reliable in operation to burn at a predetermined rate.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

Figure 2:
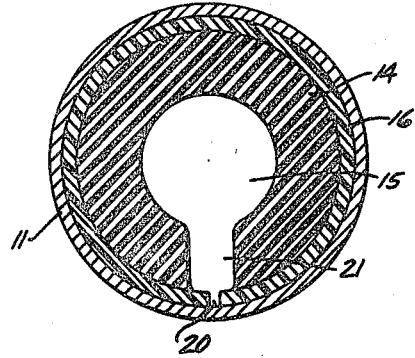
Figure 3:
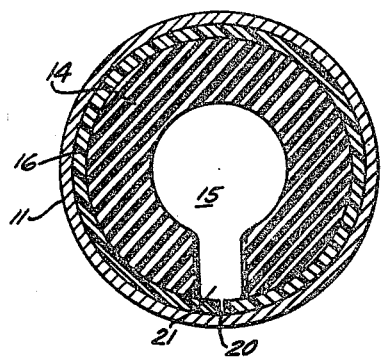

In the drawing:

FIGURE 1 is a longitudinal sectional view through a rocket engine and illustrating a grain of a solid propellant therein which incorporates the novel features of the present invention;

FIGURE 2 is a transverse sectional view taken on line 2—2 of FIGURE 1 to illustrate the grain bonded to a flame inhibiting shell around its periphery, and showing the slot in the shell to permit expansion and contraction of the grain and shell relative to the rocket engine casing; and FIGURE 3 is a view similar to FIGURE 2 and showing the flame inhibiting shell moved relative to the engine casing from the position illustrated in FIGURE 2.

Referring now to the drawing, the invention is shown applied to a rocket engine 10 having a generally cylindrical casing 11 with a domed or rounded front end 12 and a nozzle 13 at the opposite or rearward end. Casing 11 has a grain 14 therein of solid propellant and the grain is provided with an inner or axial opening 15 and an outer peripheral shell 16 of a flame inhibiting material to which the material of the grain is bonded over its entire surface. In the illustrated embodiment, the grain 14 is retained at its forward end by resilient retainer 23 and rounded or domed end 12. Inhibitor 16 is undercut to receive retainer 23 which abuts the vertical surface 24 thereof. Thus, the grain 14 has a burning surface around the periphery of the inner or axial opening 15 and annular surface 17 at both ends. It will be understood, however, that the axial opening 15 may extend throughout the entire length of the grain 14, or the grain may be restricted on one or both ends.

The grain 14 may comprise any solid material that can be used as a propellant, such as a propellant based on a poly-sulphide polymer, or any other suitable single or multiple based propellant material. The flame inhibiting shell 16 may be made of a plastic, such as cellulose acetate which burns, if at all, at a slower rate than the grain. The solid fuel 14 is cast in the shell 16 or otherwise cemented to the shell to form a cartridge which, in turn, is inserted in the casing. To this end, the casing 11, nozzle 13 or front end 12 are made in separate parts with the casing open at one or the other end to receive the cartridge. The nozzle 13 for the purpose herein has a rearwardly extending annular flange 18 at its forward end adapted to be inserted in and closely fit the rearward edge portion 19 of the casing 11 adjacent its open end. The flange 18 of the nozzle 13 and rearward overlying edge portion 19 of the casing are then attached to each other in any suitable way. In a similar manner, front end 12 is constructed and fitted to the front portion of casing 11 and abuts retainer 23 at its opposite side from vertical surface 24.

In accordance with the present invention, an improved structure is provided in the grain 14 to relieve strain, due to thermal cycling, which produces cracks or fissures and adversely affects its burning characteristics. This structure comprises a longitudinal slot 20 in the flame inhibiting shell 16 in which the propellant is cast and to which the propellant is bonded. Thus, the slot 20 permits the combined solid propellant grain 14 and shell 16 to flex as a unit, both radially and circumferentially, upon expansion or contraction, due to a temperature change, to materially reduce the strain of the grain. Also, the shell 16 is free to expand and contract relative to the engine casing 11 as it is retained axially by resilient retainer 23. The grain 14 also is provided with a slot 21 which straddles the slot 20 in the shell 16 as illustrated in FIGURES 2 and 3. In the illustrated embodiment, the slot 21 and opening 15 form a keyhole shaped opening in the grain, but the slot and opening may have other shapes.

FIGURE 2 illustrates the maximum expansion of propellant grain 14, corresponding to a high temperature, while FIGURE 3 illustrates the narrower spacing between the sides of the slot 20 with a maximum contraction of the grain 14, corresponding to the low temperature condition. The differences in spacing of sides of the slot may amount to only a small amount, but is exaggerated in the drawings for purposes of illustration. Sufficient space is provided between the shell 16 and the casing 11 so that the latter does not restrain the grain under thermal contraction conditions. One form of the invention having now been described in detail, the mode of operation is next explained.

The solid propellant material is cast or otherwise formed to the contour of the shell 16 with the shape of the opening 15 and slot 21 located in the casing by methods known to those skilled in the art. The material of the grain 14 is bonded to the shell 16 to form an integral structure and formed to provide the central opening 15 and slot 21. As the grain 14 cools it contracts which reduces its length. Simultaneously, the shell 16 contracts and moves to compensate for any difference in the rate of contraction of the different materials. The grain 14 and enclosing shell 16 to which the grain is bonded in an integral structure is then inserted through an open end of the casing 11 in the manner of a cartridge to the position illustrated in FIGURE 1. The end of the nozzle 13 (or front end 12 as the case may be) is then inserted into the open end of the casing so that the flange 18 of the nozzle overlies the end portion 19 of the casing and the overlapping parts are then attached to each other. The rocket engine is then complete and ready for firing.

Often a rocket engine such as herein contemplated undergoes lengthy storage periods before use. Such storage may last for a number of years during which time the rocket motor 10 will normally be subjected to thermal cycling caused by environmental temperature changes such as occur in the different seasons of the year. Thus, during the summer both the casing 11 and composite grain 14 and shell 16 to which it is bonded expand to increase their respective length which produces a relative sliding movement of the shell 16 and casing 11 to increase the width of slots 20 and 21 in the shell and grain. This relative movement of the slotted shell 16 and rocket casing 11 prevents any strain from developing in the grain 14 which would produce cracks or fissures in the material. In other words, any stress developing between the propellant charge 14 and shell 16 is converted to a movement of the shell before any strain develops. During the winter, the casing 11 and composite grain 14 and shell 16 contract at unequal rates which also results in a movement of the shell 16 relative to the engine casing 11, as shown in FIGURE 3, without producing any strain which will pull the material of the grain apart and produce cracks therein.

It will now be observed that the present invention provides an improved construction in a rocket engine which relieves the grain of strains during thermal cycling which would otherwise produce cracks and thus cause the production of excessive pressure. It also will be observed that the present invention provides a grain which is free to move relative to the inner periphery of the casing to prevent strain due to expansion and contraction. It also will be observed that the present invention provides a grain having an inner free burning surface and an outer flame inhibiting surface which is free to expand and contract peripherally in the casing. It will still further be observed that the present invention provides a grain for a rocket engine which is of simple and compact construction, economical to manufacture and one which is reliable in operation to produce burning at a predetermined controlled rate.

While a single embodiment of the invention is herein illustrated and described, it will be understood that changes may be made in the construction and arrangement of elements without departing from the spirit or scope of the invention. Therefore, without limitation in this respect, the invention is defined by the following claims.

I claim:

1. In a gas generator, a casing, a grain of a solid combustible material freely movable in said casing, said grain having an exposed surface for burning at a controlled rate, an outer shell of a flame inhibiting material surrounding the grain and to which the grain is bonded, and said shell having a slot extending longitudinally of the grain to permit it to move relative to the casing to reduce the stress in the grain during thermal cycling.

2. A gas generator in accordance with claim 1 in which the casing and grain are cylindrical, said grain having an axial opening comprising said exposed burning surface, and said grain having a slot in radial alignment with the slot in said shell and said slot in said grain extending through the grain to the axial opening whereby said outer shell of inhibiting material may move circumferentially relative to the casing to reduce the internal stress in the grain during thermal cycling.

3. A rocket motor in accordance with claim 1 in which the grain and outer shell are in the form of a cartridge for insertion in the casing, and said slot in the shell permits it to freely expand and contract.

4. A gas generator in accordance with claim 1 in which the casing is a rocket engine casing and the combustible material is a double base propellant.

References Cited by the Examiner

UNITED STATES PATENTS

| 2,544,538 | 3/51 | Mahnken et al. | 60—39.32 |
|---|---|---|---|
| 2,933,041 | 4/60 | Ambrose | 60—35.6 |
| 2,957,309 | 10/60 | Kobbeman | 60—35.6 |
| 2,982,090 | 5/61 | Adelman | 60—35.6 |
| 2,988,877 | 6/61 | Shope | 60—35.6 |
| 3,009,385 | 11/61 | Burnside | 60—35.6 |
| 3,017,744 | 1/62 | Jett | 60—35.6 |
| 3,032,975 | 5/62 | Alden | 60—35.6 |
| 3,048,968 | 8/62 | Hutchinson | 60—35.6 |

FOREIGN PATENTS

| 1,112,030 | 11/55 | France. |
|---|---|---|
| 17,994 | 9/94 | Great Britain. |

SAMUEL LEVINE, *Primary Examiner.*